US010489663B2

United States Patent
Olson et al.

(10) Patent No.: US 10,489,663 B2
(45) Date of Patent: Nov. 26, 2019

(54) SYSTEMS AND METHODS FOR IDENTIFYING CHANGES WITHIN A MAPPED ENVIRONMENT

(71) Applicant: Toyota Research Institute, Inc., Los Altos, CA (US)

(72) Inventors: Edwin B. Olson, Ann Arbor, MI (US); Michael R. James, Northville, MI (US); Ryan M. Eustice, Ann Arbor, MI (US); Ryan W. Wolcott, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 145 days.

(21) Appl. No.: 15/495,735

(22) Filed: Apr. 24, 2017

(65) Prior Publication Data
US 2018/0307915 A1    Oct. 25, 2018

(51) Int. Cl.
  *G06K 9/00*  (2006.01)
  *G06K 9/62*  (2006.01)
  *G05D 1/02*  (2006.01)
  *G06K 9/32*  (2006.01)

(52) U.S. Cl.
  CPC ....... *G06K 9/00791* (2013.01); *G05D 1/0231* (2013.01); *G05D 1/0251* (2013.01); *G06K 9/3233* (2013.01); *G05D 2201/0212* (2013.01)

(58) Field of Classification Search
  CPC ............. G06K 9/00791; G06K 9/6267; G06K 9/6215; G05D 1/0248; G05D 1/0251
  See application file for complete search history.

(56) References Cited

U.S. PATENT DOCUMENTS

| 7,627,414 | B2 * | 12/2009 | Goto | G01C 21/32 |
| | | | | 342/64 |
| 8,233,660 | B2 | 7/2012 | Fritsch et al. | |
| 8,630,456 | B2 | 1/2014 | Asahara et al. | |
| 8,948,501 | B1 | 2/2015 | Kim et al. | |
| 8,977,007 | B1 | 3/2015 | Ferguson et al. | |
| 9,329,269 | B2 | 5/2016 | Zeng | |
| 9,459,625 | B1 * | 10/2016 | Ferguson | G05D 1/0212 |
| 9,557,736 | B1 * | 1/2017 | Silver | G06K 9/00812 |

(Continued)

FOREIGN PATENT DOCUMENTS

JP    2013115803    6/2013

OTHER PUBLICATIONS

Ferguson, Dave, et al. "Detection, prediction, and avoidance of dynamic obstacles in urban environnnents." 2008 IEEE Intelligent Vehicles Symposium. IEEE, 2008. (Year: 2008).*

(Continued)

*Primary Examiner* — Bobbak Safaipour
(74) *Attorney, Agent, or Firm* — Christopher G. Darrow; Darrow Mustafa PC

(57) ABSTRACT

System, methods, and other embodiments described herein relate to identifying changes between models of a locality. In one embodiment, a method includes, in response to determining that a location model is available for a present environment of a vehicle, generating a current model of the present environment using at least one sensor of the vehicle. The method also includes isolating dynamic objects in the current model as a function of the location model. The method includes providing the dynamic objects to be identified and labeled.

20 Claims, 6 Drawing Sheets

(56) References Cited

U.S. PATENT DOCUMENTS

| | | | |
|---|---|---|---|
| 9,619,894 B2* | 4/2017 | Wang | G06T 7/73 |
| 10,109,198 B2* | 10/2018 | Qiu | G08G 1/164 |
| 2008/0162027 A1* | 7/2008 | Murphy | B60W 50/14 |
| | | | 701/117 |
| 2010/0034422 A1 | 2/2010 | James et al. | |
| 2010/0161225 A1* | 6/2010 | Hyung | G06T 17/00 |
| | | | 701/301 |
| 2010/0215254 A1 | 8/2010 | Prokhorov | |
| 2011/0255741 A1 | 10/2011 | Jung et al. | |
| 2014/0368493 A1 | 12/2014 | Rogan et al. | |
| 2016/0165795 A1* | 6/2016 | Balutis | G05D 1/0265 |
| | | | 701/25 |
| 2016/0180171 A1* | 6/2016 | Kamata | G06K 9/00657 |
| | | | 382/103 |
| 2017/0031925 A1* | 2/2017 | Mishra | G06T 11/20 |
| 2017/0124476 A1* | 5/2017 | Levinson | G05D 1/0088 |
| 2017/0307746 A1* | 10/2017 | Rohani | G01S 13/42 |
| 2018/0005407 A1* | 1/2018 | Browning | G01C 21/32 |
| 2018/0150058 A1* | 5/2018 | Shapiro | G05B 19/4093 |
| 2018/0188045 A1* | 7/2018 | Wheeler | G01C 21/32 |
| 2018/0190016 A1* | 7/2018 | Yang | G06T 7/11 |
| 2018/0364717 A1* | 12/2018 | Douillard | G05D 1/024 |
| 2019/0050648 A1* | 2/2019 | Stojanovic | G06K 9/00791 |
| 2019/0102656 A1* | 4/2019 | Kwant | G06K 9/6259 |

OTHER PUBLICATIONS

Gandhi, Tarak, and Mohan Manubhai Trivedi. "Image based estimation of pedestrian orientation for improving path prediction." 2008 IEEE Intelligent Vehicles Symposium. IEEE, 2008. (Year: 2008).*

Guizilini, Vitor, and Fabio Ramos. "Online self-supervised segmentation of dynamic objects." 2013 IEEE International Conference on Robotics and Automation. IEEE, 2013. (Year: 2013).*

Shackleton et al, "Tracking People with a 360-Degree Lidar". In Proceedings of the 2010 7th IEEE International Conference on Advanced Video and Signal Based Surveillance, Boston, MA, USA, Aug. 29-Sep. 1, 2010; pp. 420-426.

* cited by examiner

SYSTEMS AND METHODS FOR IDENTIFYING CHANGES WITHIN A MAPPED ENVIRONMENT

TECHNICAL FIELD

The subject matter described herein relates in general to systems for mapping an environment and, more particularly, to comparatively analyzing models from separate scans of an environment to identify changes.

BACKGROUND

Autonomous vehicles, also referred to as self-driving cars, navigate autonomously through an environment with minimal or no human input. To navigate autonomously, a vehicle precisely determines a location within an environment so that various obstacles can be avoided and to ensure that the vehicle remains on the roadway. In general, autonomous vehicles use various sensors including, for example, LIDAR sensors, radar sensors, cameras, and other sensors to help the vehicle detect and identify obstacles and other features in the environment. Additionally, the vehicle may also use the sensors to precisely locate the vehicle within the environment. Thus, by way of example, the vehicle can use point clouds produced by a LIDAR sensor to localize the vehicle within the environment. However, localizing the vehicle in this manner generally uses a prior mapping of the environment so that the vehicle can compare inputs from the LIDAR against features of the map to provide a location.

As a result, the vehicle is preloaded with a map of the environment. Additionally, various portions of the map are labeled so that the vehicle can simply discern different features and items within the map from one another. However, as environments change over time from obstacles being modified and/or from other objects moving about, the map can become inaccurate. Moreover, subsequent data acquisitions about the environment generally result in redundant labeling of elements that have not changed. Accordingly, updating and labeling map data can be a computationally intensive task that is complicated through processing redundant data.

SUMMARY

In one embodiment, example systems and methods relate to a manner of providing updated three-dimensional models of various localities. For example, upon an initial survey of a particular environment using a light detection and ranging (LIDAR) sensor, a model produced from data provided by the LIDAR is labeled. Thus, various objects that are present in the model are identified so that the objects can be referenced thereafter. Moreover, upon a subsequent encounter with the same environment, a vehicle obtains a current model using a LIDAR sensor. Accordingly, the vehicle compares the original model and the current model by aligning the two models according to relative perspectives and comparing overlaid data points to identify changes. The changes are provided as dynamic objects that embody changes to the environment since the original model was acquired. In this way, the vehicle can provide the dynamic objects for labeling and identification without relabeling objects present in the original model.

In one embodiment, a comparative labeling system for recognizing changes in data models of a mapped environment is disclosed. The mapping system includes one or more processors and a memory that is communicably coupled to the one or more processors. The memory stores a mapping module that includes instructions that when executed by the one or more processors cause the one or more processors to, in response to determining that a location model is available for a present environment of a vehicle, generate a current model of the present environment using at least one sensor of the vehicle. The memory stores a comparison module including instructions that when executed by the one or more processors cause the one or more processors to isolate dynamic objects in the current model as a function of the location model. The comparison module includes instructions to cause the one or more processors to provide the dynamic objects from the current model to be identified and labeled.

In one embodiment, a non-transitory computer-readable medium is disclosed. The computer-readable medium stores instructions that when executed by one or more processors cause the one or more processors to perform the disclosed functions. The instructions include instructions to, in response to determining that a location model is available for a present environment of a vehicle, generate a current model of the present environment using at least one sensor of the vehicle. The instructions include instructions to isolate dynamic objects in the current model as a function of the location model. The instructions include instructions to provide the dynamic objects to be identified and labeled.

In one embodiment, a method of identifying differences between locality models is disclosed. The method includes, in response to determining that a location model is available for a present environment of a vehicle, generating a current model of the present environment using at least one sensor of the vehicle. The method includes isolating dynamic objects in the current model as a function of the location model. The method includes providing the dynamic objects to be identified and labeled.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with comparatively analyzing locality models to identify changes are disclosed. As mentioned previously, an autonomous vehicle can use a prior mapping of an environment to determine a present location within the environment when navigating. For example, the autonomous vehicle acquires mapping data about current surroundings in the form of a three-dimensional point cloud from a LIDAR. The vehicle can then align the acquired sensor data to the prior mapping to identify a current position within the environment.

Moreover, the newly acquired sensor data can be used to further map and/or update the prior mapping of the present location. Thus, the newly acquired data is analyzed to identify and label aspects of the mapping. Because the prior mapping and the current mapping are of a same locality, many aspects have been previously labeled within the prior mapping. However, the current mapping is generally labeled independently of the prior mapping, which is a tedious and computationally intensive effort.

Therefore, in one embodiment, a comparative labeling system aligns and overlays the two separate mappings. Subsequently, the comparative labeling system can comparatively analyze the overlaid data sets. As a result of this analysis, the comparative labeling system isolates the static objects such as background features (e.g., plants, buildings, etc.) or otherwise removes elements that match between the data sets. Thus, the resulting data set represents dynamic objects that were not previously present within the environment when the prior mapping was produced. Accordingly, the system can then label the dynamic objects without redundantly labeling static objects. In this way, an efficiency of identifying and labeling a model is improved.

Figure 1:
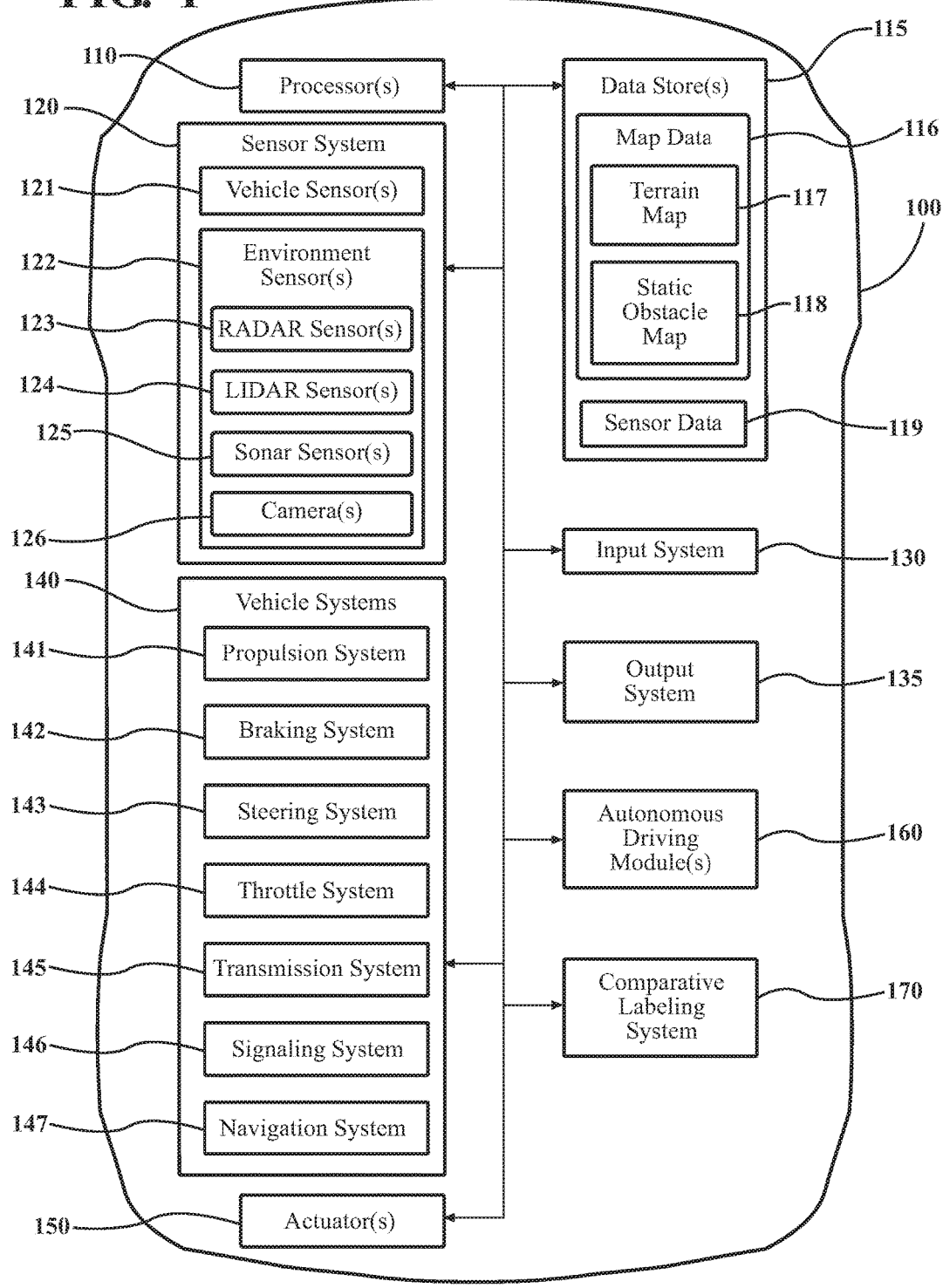
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, includes a LIDAR or other mapping sensor and thus benefits from the comparative analysis of mapping information to improve labeling as discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a comparative labeling system 170 that is implemented to perform methods and other functions as disclosed herein relating to the comparative analysis of three-dimensional maps to isolate dynamic objects between the maps (also referred to as models herein). The noted functions and methods will become more apparent with a further discussion of the figures.

Figure 2:
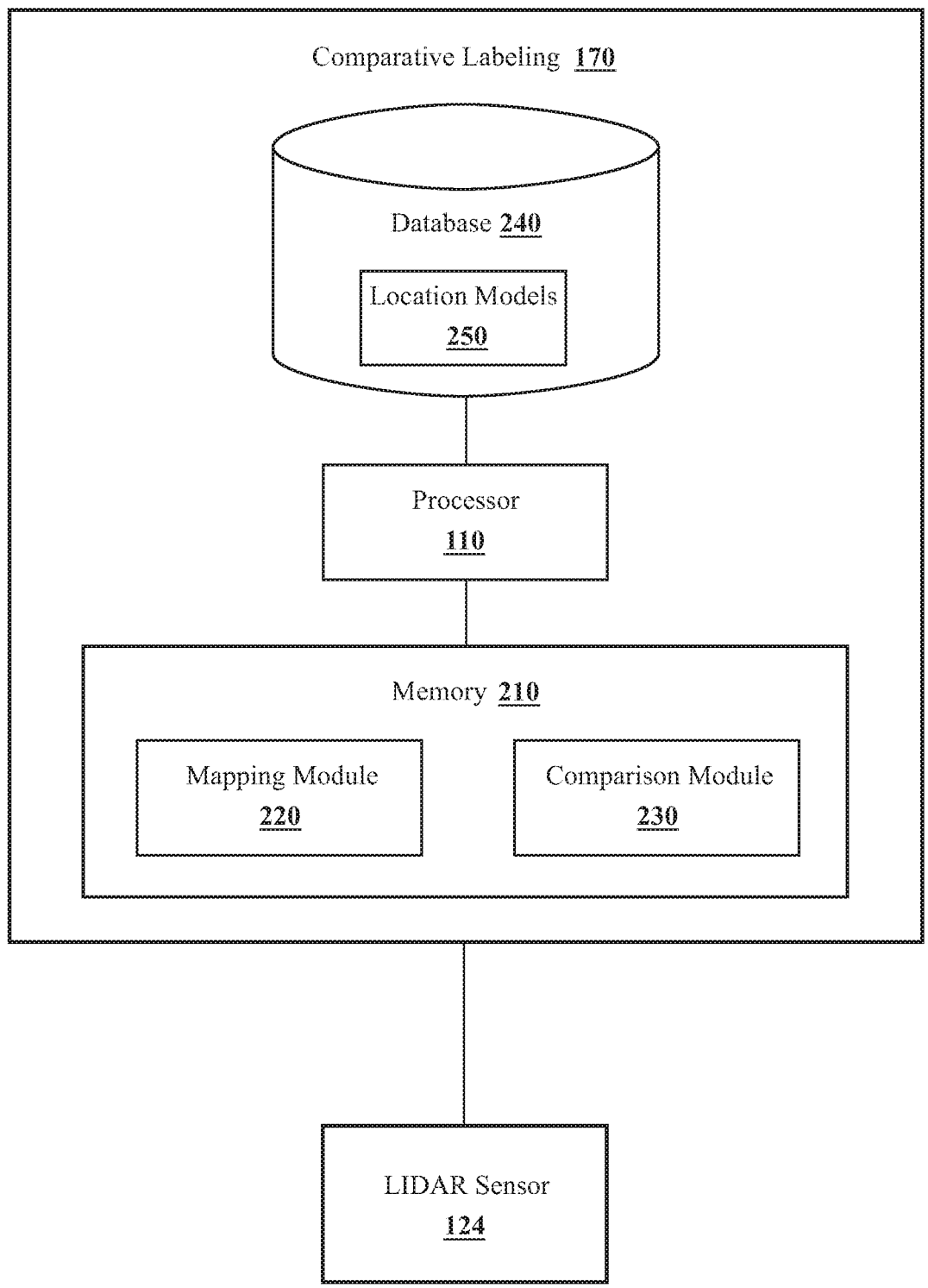
FIG. 2 illustrates one embodiment of a comparative labeling system that is associated with identifying changes in an environment embodied between separate models.

With reference to FIG. 2, one embodiment of the comparative labeling system 170 of FIG. 1 is further illustrated. The comparative labeling system 170 is shown as including a processor 110 from the vehicle 100 of FIG. 1. Accordingly, the processor 110 may be a part of the comparative labeling system 170, the comparative labeling system 170 may include a separate processor from the processor 110 of the vehicle 100 or the comparative labeling system 170 may access the processor 110 through a data bus or another communication path. In one embodiment, the comparative labeling system 170 includes a memory 210 that stores a mapping module 220 and a comparison module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the mapping module 220 generally includes instructions that function to control the processor 110 to retrieve data from sensors of a sensor system 120 of the vehicle 100. In other words, the mapping module 220 includes instructions to acquire data from a LIDAR sensor 124, a camera 126, and so on. In one embodiment, the mapping module 220 functions to control the LIDAR 124 to scan a current location/environment and produce a mapping that is a three-dimensional model. The model is, for example, a point cloud representation of the present environment around the vehicle 100 as it presently exists. That is, the LIDAR 124, as a result of scanning the present environment, returns a three-dimensional data set of points that represents points on surfaces from which a scanning waveform of the LIDAR 124 was reflected.

The mapping module 220, in one embodiment, continuously scans as the vehicle 100 progresses along a path. Thus, the mapping module 220 is continuously producing a current model for a particular environment/locality. In alternative embodiments, the mapping module 220 selectively provides a model as an output at a specified period (e.g., every 0.1 seconds). In either case, the models include a plurality of information relating to objects within the environment of the vehicle 100.

For example, a model can include three-dimensional representations of surfaces, structures, plants, traffic signs, vehicles, and other objects that are present around the vehicle 100. Accordingly, the comparative labeling system 170 or another system can process the provided model to identify and label the objects in the model. In general, labeling these objects provides the vehicle 100 with the ability to, for example, maintain situational awareness, localize the vehicle 100 within the environment, navigate through the environment and so on. Thus, the mapping module 220, in one embodiment, stores the acquired maps as location models 250 in the database 240.

Accordingly, in one embodiment, the comparative labeling system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes the location models 250 along with, for example, metadata that characterizes various aspects of the location models 250. For example, the metadata can include location coordinates (e.g., longitude and latitude), relative map coordinates or tile identifiers, time/date stamps from when the separate location models 250 are generated, and so on.

The comparison module 230, in one embodiment, uses the stored location models 250 from previous acquisitions within an environment to compare against a current location model that is acquired during a current pass through the environment. For example, the comparison module 230 loads a current model and a prior location model for the same environment into the memory 210. Thereafter, the comparison module 230 projects the current model onto the location model in order to align the two models together.

Moreover, in one embodiment, the comparison module 230 translates or otherwise modifies the current model to align differences in perspective between the models. That is, because the vehicle 100 or an originating vehicle of the prior location model may have traveled through the environment at a slightly different angle, trajectory, and/or with a different pose, the models can be slightly misaligned in perspective. Thus, the comparison module 230 projects and aligns the models together to correct discrepancies between general perspectives of each model.

Once the comparison module 230 projects the models together, corresponding data points between the models can be compared to isolate dynamic objects. That is, the comparison module 230 compares the current model with the location model to remove objects from the current model that are redundant with the location model. Resulting observation data points embody changes/differences between the current model and the location model. The changes can be from, for example, modifications to the environment (e.g., construction) since the acquisition of the location model, mobile objects moving from the environment, and so on. In either case, the comparison module 230 isolates the dynamic objects by segmenting static background objects out of the current model through the noted comparison. In this way, the dynamic objects can be processed to identify and label those objects without re-analyzing a whole of the environment.

Figure 3:
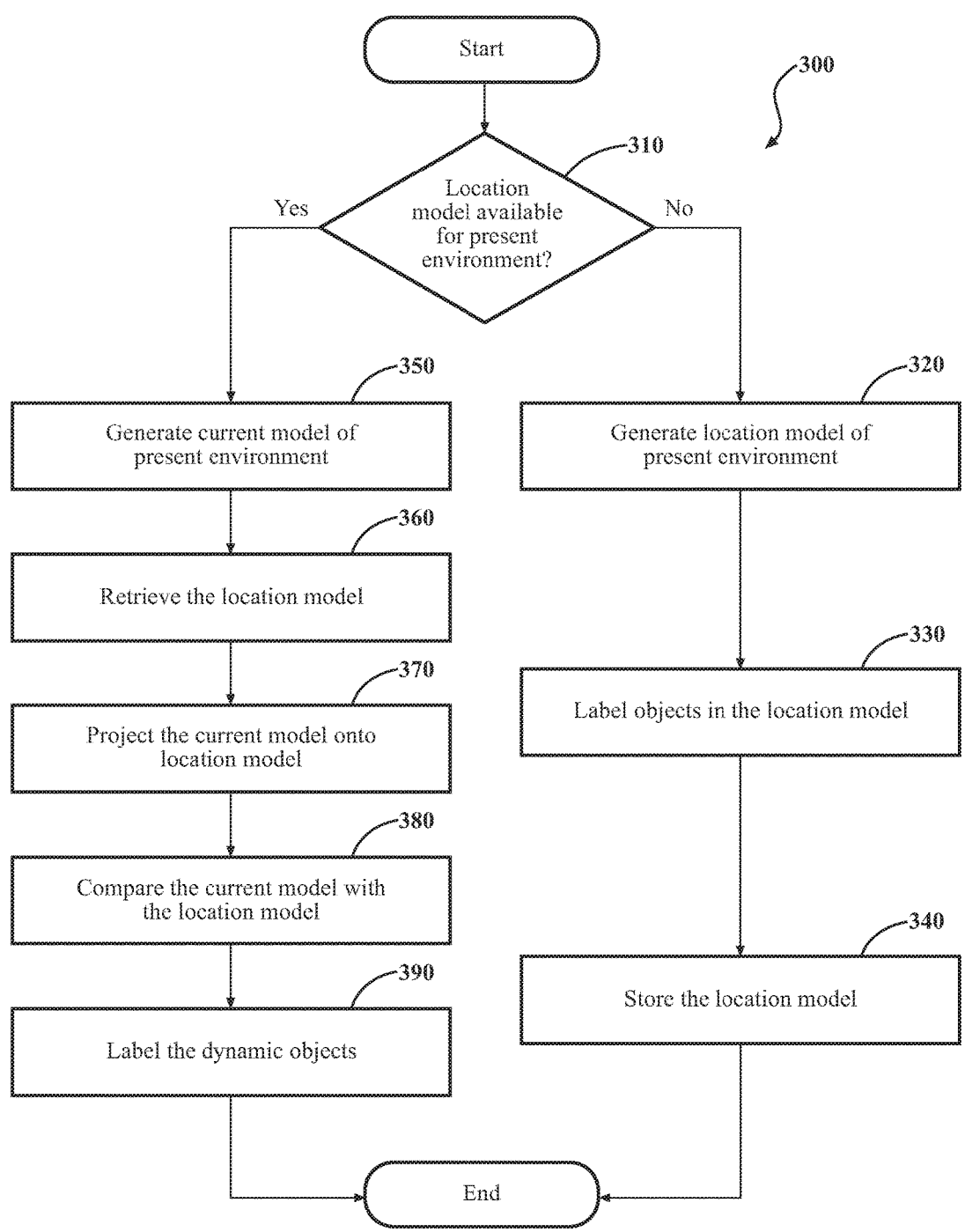
FIG. 3 illustrates one embodiment of a method that is associated with identifying changes between models of an environment.

Additional aspects of isolating dynamic objects from a locality model will be discussed in relation to FIG. 3. FIG. 3 illustrates a flowchart of a method 300 that is associated with acquiring models of an environment and selectively labeling the models through a comparative analysis. Method 300 will be discussed from the perspective of the comparative labeling system 170 of FIGS. 1 and 2. While method 300 is discussed in combination with the comparative labeling system 170, it should be appreciated that the method 300 is not limited to being implemented within the comparative labeling system 170, but is instead one example of a system that may implement the method 300.

At 310, the mapping module 220 determines if a locality model has previously been acquired for the present environment. It should be noted, that as used herein the present environment is intended to reference a geographic location that is indicative of a present location of the vehicle 100 and an area surrounding the vehicle in 360 degrees within a surveyable area of the LIDAR sensor 124.

In one embodiment, the mapping module 230 uses an indicator of a current location of the vehicle 100 to search or otherwise lookup whether a model is present in the database 240 for the present locality. In one embodiment, the mapping module 220 can query a remote server or remote service using an available communication network to determine whether a model is available. In either case, if a previously acquired location model is available, then the mapping module 220 generates a current model as discussed in relation to block 350. Otherwise, the mapping module 220 proceeds to acquire data about the present environment to generate a location model as discussed in relation to block 320.

At 320, the mapping module 220 generates a location model for the present environment. In one embodiment, the mapping module 220 generates the location model by scanning the present environment using the LIDAR sensor 124 to acquire data points from surfaces within the present environment. Thus, the mapping module 220 can control the LIDAR sensor 124 to obtain a raw data model of the present environment. Alternatively, the mapping module 220 can sniff or otherwise passively obtain scanning data from the LIDAR sensor 124 as the LIDAR sensor 124 provides information to other systems within the vehicle 100. In either case, the mapping module 220 obtains a raw data model of the present environment that is a three-dimensional point cloud including different objects.

At 330, the comparison module 230 labels objects in the location model from block 320. In one embodiment, the comparison module 230 segments individual objects from the raw location model and then classifies the objects in order to characterize the present environment and different objects. Thus, the comparison module 230, in one embodiment, extracts the separate objects from the location model, identifies the objects, and labels the objects according to the identification. Moreover, because objects are extracted from the location model, remaining portions of the model can also be segmented and classified as background (e.g., semi-permanent objects such as buildings, roadway features/surfaces, etc.). In either case, the comparison module 230 embeds the labels and information about the extracted objects back into the complete location model to provide a location model that is robustly labeled and available for use by the vehicle 100.

While the labeling is discussed as being performed by the comparison module 230 within the vehicle 100, in one embodiment, the comparison module 230 can be located on a remote server or as a cloud-computing routine that accepts raw location models and analyzes the location models to provide segmenting and labeling of objects. Moreover, in various embodiments, the comparison module 230 can be integrated within the LIDAR sensor 124 to avoid using bandwidth for communicating location models across data buses of the vehicle 100 or communications networks connected with remote servers.

At 340, the comparison module 220 stores the location model. In one embodiment, the model is stored in a local memory such as the memory 210 or another memory that includes the database 240. Alternatively, the mapping module 220 stores the location model in a cloud-based or other distributed memory. Thus, the location models 250 can be stored in a remote location and can be accessible by the vehicle 100 so that the database 240 can be, for example, crowd-sourced and maintained apart from the vehicle 100.

At 350, the mapping module 220 generates a current model of the present environment in a similar manner as discussed in relation to block 320. In one embodiment, the mapping module 220 generates the current model, at 350, to match a perspective of the location model that was previously acquired for the same location. For example, when the vehicle 100, a surveying vehicle, or another LIDAR carrying device previously traveled through the present environment, the location model was generated according to a particular position of the LIDAR within the present environment. That is, whichever machine (e.g., the vehicle 100, etc.) acquired the location model may have had a slightly different pose or path through the present environment than that of the vehicle 100 when acquiring the current model.

Accordingly, the mapping module 220 may use information about the location model when acquiring the current model. In one embodiment, the mapping module 220 can provide an indication to, for example, the autonomous driving module 160 to indicate to the vehicle 100 a preferred path that best aligns the models. However, in general, the mapping module 220 controls acquisition of the current model without regard to a particular path or pose and instead accounts for such variables subsequently. Additionally, the mapping module 220, in one embodiment, stores the current model in the memory 210 or another working memory such as a cache or RAM for analysis by the comparison module 230.

At 360, the comparison module 230 retrieves the location model. As mentioned previously, the location model is a three-dimensional model of the present environment that was previously acquired, segmented, and labeled. Thus, the location model includes representations of objects that were within the present environment at a point in time of a most recent pass-through. In one embodiment, the comparative labeling system 170 maintains the database 240 in a local manner within the vehicle 100 by storing the location models for areas through which the vehicle 100 has traveled. Thus, in this approach, the previous acquisitions are made by the vehicle 100.

However, in an alternative embodiment, the database 240 is maintained remotely in a distributed memory or cloud-computing environment and information used to populate the database 240 is crowd-sourced from a plurality of different vehicles that can scan and relay models about different localities. Thus, in various implementations, the location models 250 are maintained by the vehicle 100 and potentially additional vehicles.

At 370, the comparison module 230 projects the current model onto the location model. In one embodiment, the comparison module 230 projects the models together by aligning the models and overlaying respective data points. That is, the comparison module 230 analyzes the current model in relation to the location model to identify differences in pose, angle or other general characteristics of a field-of-view from which the respective models were acquired. The comparison module 230 can then align and overlay the models by adjusting a perspective of the current model with a perspective of the location model. This alignment process improves the correspondence between identical elements within each of the models so that the comparison module 230 can accurately determine changes between the current model and the location model. In either case, after the comparison module 230 projects the current model onto the location model a result is, for example, a combined data set that includes data points from both models.

At 380, the comparison module 230 compares the current model with the location model to isolate dynamic objects in the current model. As an initial matter, it should be understood that the use of the phrase dynamic objects is intended to encompass objects that change between one model to the next over time. That is, the phrase dynamic objects does not solely refer to objects that are mobile such as vehicles, people, animals, and so on, but is also intended to encompass changes to semi-permanent objects such as buildings, roadways, traffic signs, sidewalks, curbs, vegetation and so on.

Accordingly, the comparison module 230 compares the current model with the location model by differencing or otherwise analyzing the models in the projected form to identify changes between the location model and the current model. The comparison module 230 can use this process to identify the dynamic objects, isolate the dynamic objects from surrounding portions of the model, and to, for example, extract the dynamic objects from the current model. Moreover, the comparison module 230, in one embodiment, can separately account for objects in the location model that are mobile or otherwise considered to have a likelihood of moving. That is, for example, where the location model includes objects that have a tendency to move with regularity such as parked vehicles, bicycles, and so on, the comparison module 230 will generally not indicate an absence of those items within the current model as a change. Instead, the comparison module 230, in one embodiment, can isolate newly revealed objects that are revealed as previously being behind mobile objects.

Furthermore, the comparison module 230, in one embodiment, can provisionally mark or otherwise indicate that certain objects are likely to move or are not permanent modifications to the present environment. For example, when a vehicle is parked along a roadway the comparison module 230 can identify the parked vehicle as a provisional or mobile object within the environment. In this way, mapping of the present environment can be directed to maintain features behind the parked vehicle within the location model when updated even if occluded by the parked vehicle or another object.

In either case, the comparison module 230 compares data points between the current model and the location model to determine differences within the current model and to isolate the dynamic objects. As part of isolating the dynamic objects, the comparison module 230 can segment the dynamic objects from background sections of the current model using the comparison of the two models. Furthermore, in one embodiment, the comparison module 230 marks the dynamic objects using bounding box or other markers in order to associate data points of a dynamic object together.

At 390, the comparison module 230 provides the dynamic objects to be labeled. The comparison module 230 can individually provide the dynamic objects as a set of related data points, provide the current model with the dynamic objects marked, and/or provide a version of the current model with static objects (i.e., unchanged portions) removed and the dynamic objects isolated in a three-dimensional space in a relationship as within the current model.

In either choice of formatting, the comparison module 230, in one embodiment, transmits or otherwise communicates the dynamic objects to a remote service such as a software as a service (SaaS) or cloud computing service to classify the dynamic objects. Consequently, the comparison module 230 can receive a response for each of the dynamic objects specifying an identified type, class or other information about the objects. Moreover, the database 240 can be updated to reflect the labeled dynamic objects so that the corresponding location model is maintained in an up-to-date fashion.

In an alternate embodiment, the comparison module 230 includes a machine learning or deep learning functionality for processing the dynamic objects to produce labels. Accordingly, the comparison module 230 can self-label the dynamic objects and/or provide the dynamic objects to a remote service but along with the determined label information. Accordingly, the remote service can corroborate the labeling of the comparison module 230 and provide a communication that validates the labeling or that corrects any errors.

Moreover, in one embodiment, the comparison module 230 along with providing the dynamic objects can also provide additional validation data. The validation data may be in the form of data from additional sensors on the vehicle 100 such as images from the cameras 126 that can be used to validate classification of the dynamic objects.

Figure 4:
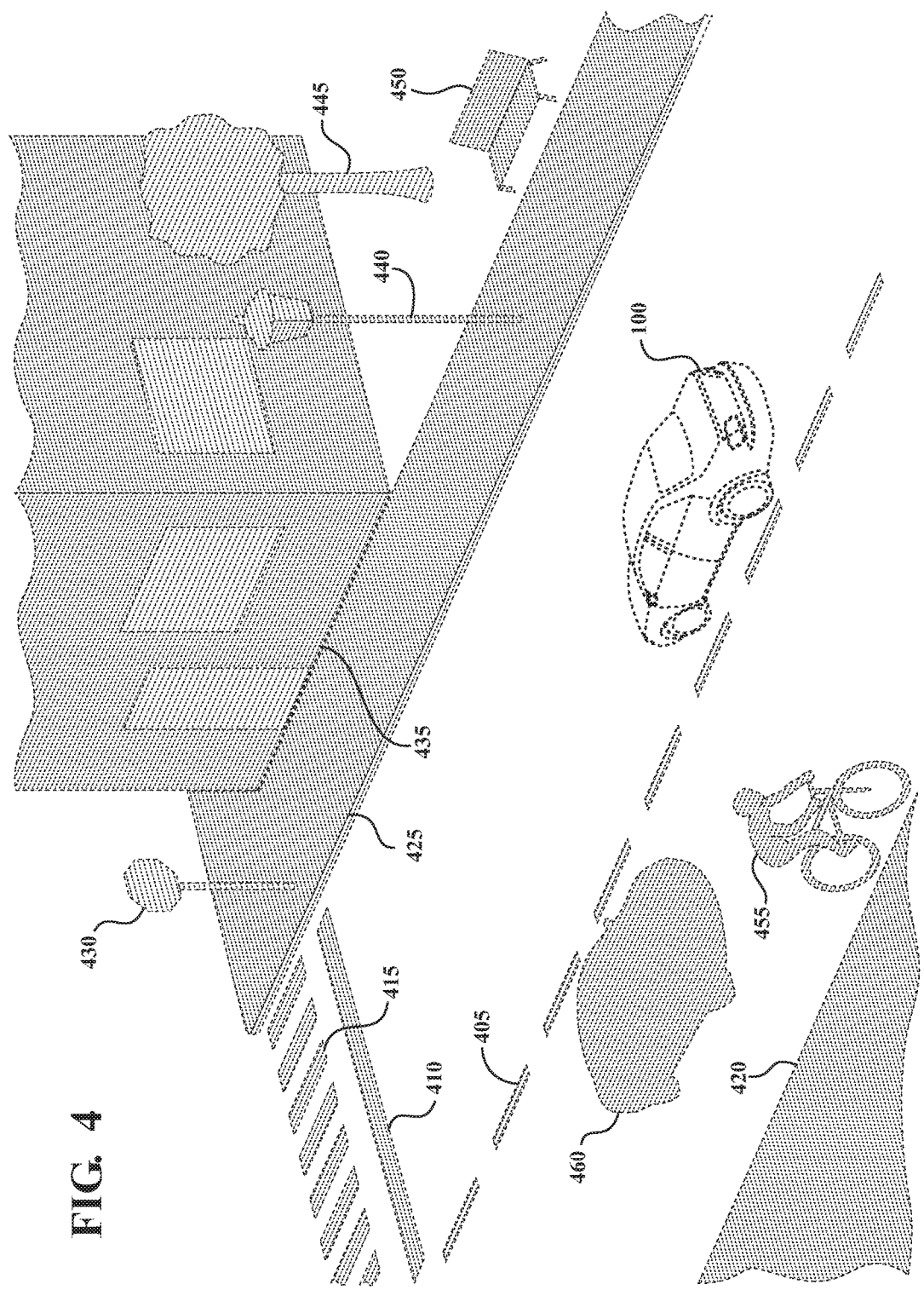
FIG. 4 illustrates one example of a model of an environment as produced by a LIDAR.
Figure 5:
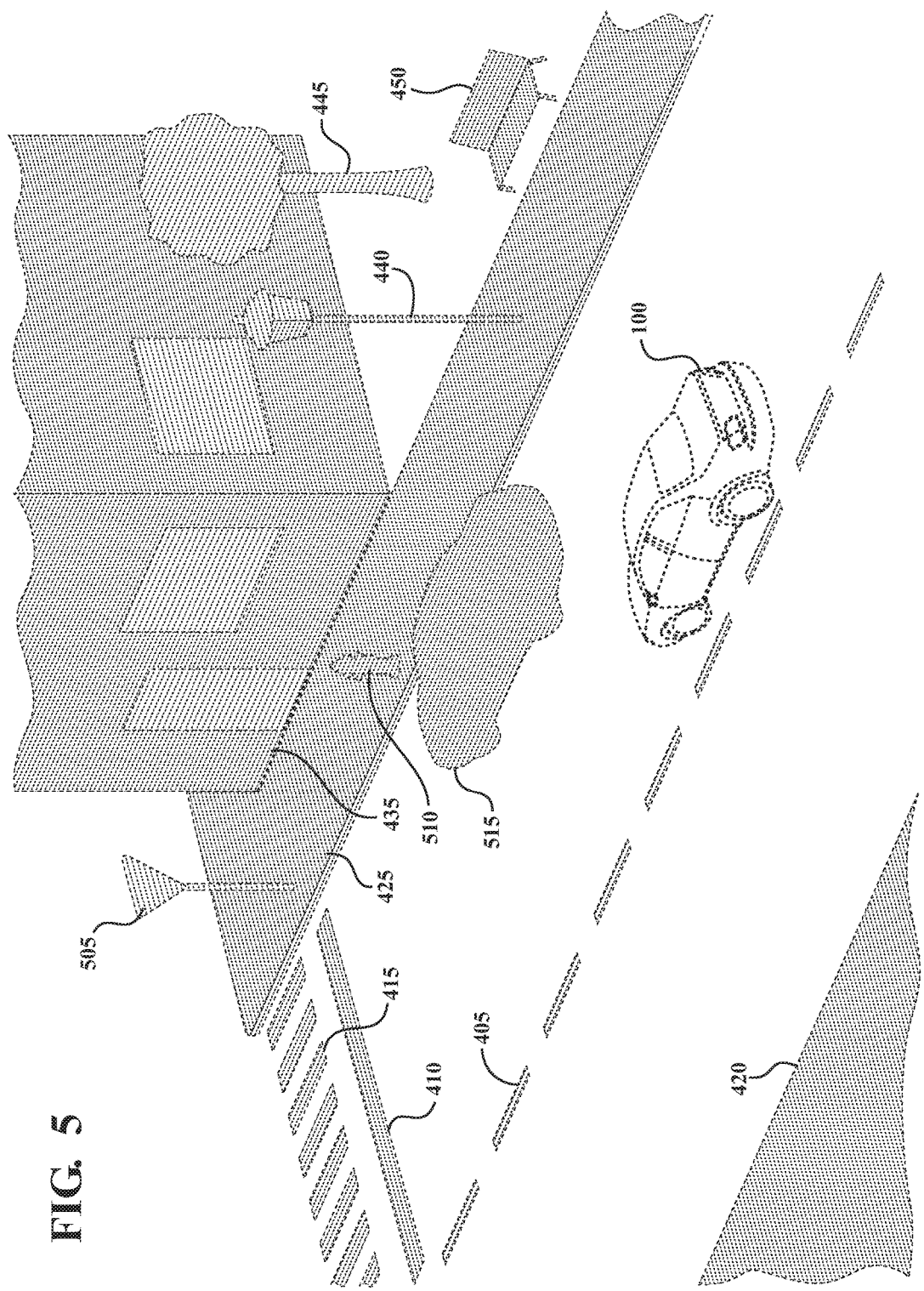
FIG. 5 illustrates another model of the environment illustrated in FIG. 4.
Figure 6:
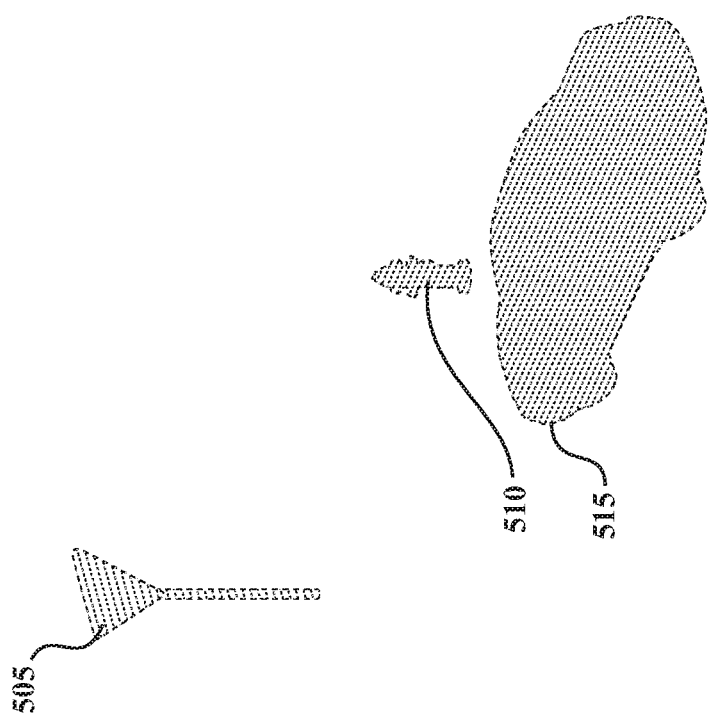
FIG. 6 illustrates isolated dynamic objects from FIG. 5.

FIGS. 4-6 further illustrate how the comparative labeling system 170 can isolate dynamic objects from a model. FIG. 4 is an example illustration of objects in a model 400 of a present environment. The model 400 is illustrated as including the vehicle 100 as a point of reference for the originating position of the data acquisition for the environment. As illustrated, the mapping module 220 acquires data points detailing objects such as lane markers 405 and 410 on a road surface, a crosswalk 415, a curb 420, a curb 425, a traffic sign 430, a building 435, a light post 440, a tree 445, a bench 450, a bicycle 455 and an oncoming vehicle 460.

Accordingly, for purposes of discussion, consider that the model 400 is acquired by the comparative labeling system 170 upon an initial pass through the environment. That is, the model 400 is acquired by the LIDAR sensor 124 in a similar fashion as discussed in relation to block 320 of method 300. Consequently, the various objects present in the model 400 are segmented, labeled, and stored as the location model and according to processing discussed in relation to blocks 330 and 340 of method 300. Thus, the comparison module 230 can use the labeled model 400 to distinguish the separate objects in the environment subsequently. Moreover, as previously discussed, the comparison module 230 can identify provisional or mobile objects such as the bike 455 and the oncoming vehicle 460 as objects that will likely not be present in a subsequent model and that are thus occluding other details of the environment.

Thus, with reference to FIG. 5, a subsequent model 500 is illustrated from a later acquisition with the LIDAR sensor 124. It should be noted that the model 500 and the model 400 are acquired from a substantially similar point within the environment in order to provide a common point of comparison. The model 500 includes dynamic objects 505, 510, and 515. The traffic sign 505 replaces a previous traffic sign 430. The fire hydrant 510 and the car 515 are also newly present in the environment.

By way of example, upon the mapping module 220 acquiring the model 500, the comparison module 230 retrieves the model 400 from the database 240 and loads both the model 400 and the model 500 into a working memory. Thereafter, the comparison module 230 projects the model 500 (i.e., the current model) onto the model 400 (i.e., the location model) as discussed in relation to block 370 of method 300. Accordingly, the comparison module 230 can adjust a perspective of the model 500 to improve alignment when the two models are projected together to overlay the respective data points. In either case, the comparison module 230 compares or otherwise differences the data points to determine changes between the two models.

Accordingly, FIG. 6 illustrates an isolated view 600 of the dynamic objects identified from the comparison by the comparison module 230 as in block 380 of method 300. Thus, the view 600 includes the yield sign 505, the fire hydrant 510, and the car 515. It should be noted that the view 600 does not indicate the absence of the car 460 or the bike 455 which are shown in the model 400 but not in the model 500. This is because, in one embodiment, the comparison module 230 is aware that these are mobile or provisional objects and the movement of these objects out of the environment does not reveal any new objects, terrain or other features. Of course, in other examples, the movement of the provisional/mobile objects may reveal additional objects or features that would qualify as dynamic objects. Accordingly, removal of an object from the environment can result in changes being provided from newly revealed features.

Additionally, as previously mentioned, the dynamic objects can be provided in an isolated view as in the view 600 that maintains relative distances and other information about the dynamic objects in the environment. Alternatively, the dynamic objects can be removed/segmented from the model 500 and provided in an isolated form for classification. Furthermore, as also mentioned previously, the dynamic objects can be classified/labeled locally by the comparative labeling system 170 or remotely by a cloud-based service. In either case, the location model 400 is updated to reflect the changes embodied by the dynamic objects upon the objects being labeled.

Consequently, in one embodiment, the location model can maintain information about areas within the environment that subsequently become occluded by provisional/mobile objects even though the objects are temporarily or semi-permanently blocking a view of the particular segments within the environment.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the comparative labeling system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the comparative labeling system 170, and/or the autonomous driving module(s) 160 may control some or all of these vehicle systems 140 and, thus, may be partially or fully autonomous.

The processor(s) 110, the comparative labeling system 170, and/or the autonomous driving module(s) 160 can be operatively connected to communicate with the various vehicle systems 140 and/or individual components thereof. For example, returning to FIG. 1, the processor(s) 110, the comparative labeling system 170, and/or the autonomous driving module(s) 160 can be in communication to send and/or receive information from the various vehicle systems 140 to control the movement, speed, maneuvering, heading, direction, etc. of the vehicle 100. The processor(s) 110, the comparative labeling system 170, and/or the autonomous driving module(s) 160 may control some or all of these vehicle systems 140.

The processor(s) 110, the comparative labeling system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the comparative labeling system 170, and/or the autonomous driving module(s) 160 can control the direction and/or speed of the vehicle 100. The processor(s) 110, the comparative labeling system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with other systems can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-2, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A comparative labeling system for recognizing changes in locality models of a mapped environment, comprising:
   one or more processors;
   a memory communicably coupled to the one or more processors and storing:
   a mapping module including instructions that when executed by the one or more processors cause the one or more processors to, in response to determining that a location model is available for a present environment of a vehicle, generate a current model of the present environment using at least one sensor of the vehicle; and
   a comparison module including instructions that when executed by the one or more processors cause the one or more processors to:
   isolate dynamic objects in the current model as a function of the location model, wherein the dynamic objects include semi-permanent objects of the present environment that change between the current model and the location model, and
   provide the dynamic objects from the current model to be identified and labeled, wherein the location model is a three-dimensional representation of the present environment that was previously acquired and labeled to identify the semi-permanent objects including at least static aspects of the present environment.

2. The comparative labeling system of claim 1, wherein the comparison module further includes instructions to isolate the dynamic objects by projecting the current model onto the location model to align the current model with the location model and to identify changes between the location model and the current model that correspond with the dynamic objects, and
   wherein the comparison module further includes instructions to isolate the dynamic objects including instructions to label mobile objects that are part of the dynamic objects as provisional when the mobile objects are presently not moving but are determined to likely move and to label the dynamic objects that are semi-permanent objects according to an object class.

3. The comparative labeling system of claim 2, wherein the comparison module further includes instructions to project the current model onto the location model by aligning a perspective of the current model with the location model to overlay corresponding points between the current model and the location model, and
   wherein the comparison module further includes instructions to isolate the dynamic objects by comparing the current model with the location model to produce observation data points that embody the dynamic objects of the present environment while removing static objects that form a background of the present environment that is unchanged.

4. The comparative labeling system of claim 1, wherein the location model is a three-dimensional representation of the present environment that was previously acquired and labeled to identify static objects in the present environment.

5. The comparative labeling system of claim 1, wherein the comparison module further includes instructions to provide the dynamic objects by transmitting data from a light detection and ranging (LIDAR) sensor and a camera sensor about the dynamic objects to a remote server for labeling, and wherein the data from the camera sensor is validation data.

6. The comparative labeling system of claim 1, wherein the mapping module further includes instructions to generate the current model by scanning the present environment of the vehicle using at least a light detection and ranging (LIDAR) sensor to acquire the current model as a three-dimensional point cloud, and
   wherein comparison module includes instructions to provide the dynamic objects including instructions to electronically communicate at least LiDAR data of the dynamic objects to a remote system for labeling to improve updating of the location model using the dynamic objects.

7. The comparative labeling system of claim 1, wherein the vehicle is an autonomous vehicle.

8. The comparative labeling system of claim 1, wherein the mapping module further includes instructions to:
   in response to determining the location model is not available for the present environment, generate the location model by scanning the present environment using the at least one sensor to obtain three-dimensional data points representing present objects in the present environment that are collected to form the location model, and
   label the present objects to identify types of the present objects of the present environment.

9. A non-transitory computer-readable medium storing instructions that when executed by one or more processors cause the one or more processors to:
   in response to determining that a location model is available for a present environment of a vehicle, generate a current model of the present environment using at least one sensor of the vehicle;
   isolate dynamic objects in the current model as a function of the location model, wherein the dynamic objects include semi-permanent objects of the present environment that change between the current model and the location model; and
   provide the dynamic objects to be identified and labeled, wherein the location model is a three-dimensional representation of the present environment that was previously acquired and labeled to identify the semi-permanent objects including at least static aspects of the present environment.

10. The non-transitory computer-readable medium of claim 9, wherein the instructions to isolate the dynamic objects include instructions to project the current model onto the location model to align the current model with the location model and to identify changes between the location model and the current model that correspond with the dynamic objects, and wherein the instructions to isolate the dynamic objects include instructions to label mobile objects that are part of the dynamic objects as provisional when the mobile objects are presently not moving but are determined to likely move and to label the dynamic objects that are semi-permanent objects according to an object class.

11. The non-transitory computer-readable medium of claim 10, wherein the instructions to project the current model onto the location model include instructions to align a perspective of the current model with the location model to overlay corresponding points between the location model and the current model, and wherein the instructions to isolate the dynamic objects include instructions to compare the current model with the location model to produce observation data points that embody the dynamic objects of the present environment while removing static objects that form a background of the present environment that is unchanged.

12. The non-transitory computer-readable medium of claim 9, wherein the location model is a three-dimensional representation of the present environment that was previously acquired and labeled to identify static objects in the present environment, wherein the instructions to provide the dynamic objects include instructions to transmit data from a light detection and ranging (LIDAR) sensor and a camera sensor about the dynamic objects to a remote server for labeling, and wherein the data from the camera sensor is validation data.

13. The non-transitory computer-readable medium of claim 9, wherein the instructions to generate the current model include instructions to scan the present environment of the vehicle using at least a light detection and ranging (LIDAR) sensor to acquire the current model as a three-dimensional point cloud.

14. A method of identifying differences between locality models, comprising:

in response to determining that a location model is available for a present environment of a vehicle, generating a current model of the present environment using at least one sensor of the vehicle;

isolating dynamic objects in the current model as a function of the location model, wherein the dynamic objects include semi-permanent objects of the present environment that change between the current model and the location model; and providing the dynamic objects to be identified and labeled, wherein the location model is a three-dimensional representation of the present environment that was previously acquired and labeled to identify the semi-permanent objects including at least static aspects of the present environment.

15. The method of claim 14, further comprising:

in response to determining the location model is not available for the present environment, generating the location model by scanning the present environment using the at least one sensor to obtain three-dimensional data points representing present objects in the present environment that are collected to form the location model; and labeling the present objects to identify types of the present objects of the present environment.

16. The method of claim 14, wherein isolating the dynamic objects includes projecting the current model onto the location model to align the current model with the location model and to identify changes between the location model and the current model that correspond with the dynamic objects, and wherein isolating the dynamic objects includes labeling mobile objects that are part of the dynamic objects as provisional when the mobile objects are presently not moving but are determined to likely move and to label the dynamic objects that are semi-permanent objects according to an object class.

17. The method of claim 16, wherein projecting the current model onto the location model includes aligning a perspective of the current model with the location model to overlay corresponding points within the present environment, and wherein isolating the dynamic objects includes comparing the current model with the location model to produce observation data points that embody the dynamic objects of the present environment while removing static objects that form a background of the present environment that is unchanged.

18. The method of claim 14, further comprising:

controlling the vehicle to navigate through the present environment according to the location model including updates derived from the dynamic objects, wherein the location model is a three-dimensional representation of the present environment that was previously acquired and labeled to identify static objects in the present environment.

19. The method of claim 14, wherein providing the dynamic objects includes transmitting data from a LIDAR sensor and a camera sensor about each of the dynamic objects to a remote server for labeling, and wherein the data from the camera sensor is validation data for the dynamic objects.

20. The method of claim 14, wherein generating the current model includes scanning the present environment of the vehicle using at least a light detection and ranging (LIDAR) sensor to acquire the current model as a three-dimensional point cloud, and wherein providing the dynamic objects includes electronically communicating at least LiDAR data of the dynamic objects to a remote system for labeling to improve updating of the location model using the dynamic objects.

* * * * *